(12) United States Patent
Tiribuzi

(10) Patent No.: US 6,256,599 B1
(45) Date of Patent: Jul. 3, 2001

(54) METHOD FOR THE REPRESENTATION OF PHYSICAL PHENOMENA EXTENDING IN A BI- OR TRIDIMENSIONAL SPATIAL DOMAIN THROUGH SEMISTRUCTURED CALCULATION GRID

(75) Inventor: Stefano Tiribuzi, Pisa (IT)

(73) Assignee: Enel S.P.A., Rome (IT)

( * ) Notice: Subject to any disclaimer, the term of this patent is extended or adjusted under 35 U.S.C. 154(b) by 0 days.

(21) Appl. No.: 09/152,260

(22) Filed: Sep. 14, 1998

(30) Foreign Application Priority Data

Sep. 15, 1997 (IT) .............................. FI97A0210

(51) Int. Cl.⁷ .............................. G06F 17/10; G06F 17/50
(52) U.S. Cl. .................................................. 703/2; 703/6
(58) Field of Search .................. 703/1, 2, 6; 364/468.03, 364/468.04; 345/418, 419, 423, 424, 425, 428, 429, 430; 702/5, 6, 11–13, 16

(56) References Cited

U.S. PATENT DOCUMENTS

| | | | |
|---|---|---|---|
| 4,787,057 | * 11/1988 | Hammond | 708/607 |
| 4,819,161 | * 4/1989 | Konno et al. | 364/191 |
| 5,570,460 | * 10/1996 | Ramanujam | 395/124 |
| 5,732,203 | * 3/1998 | Menegazzi | 345/420 |
| 5,740,342 | * 4/1998 | Kocberber | 345/420 |
| 5,883,629 | * 3/1999 | Johnson | 345/419 |
| 6,018,497 | * 1/2000 | Gunasekera | 367/72 |
| 6,037,949 | * 3/2000 | DeRose et al. | 345/430 |
| 6,106,561 | * 8/2000 | Farmer | 703/10 |

OTHER PUBLICATIONS f. 'Dynamic Catmull–Clark Subdivision Surfaces', 1998, Hong Qin and Baba Vemuri, 1998 IEEE paper 1077–2626/98 pp. 215–229.* e. 'Dynamic Smooth Subdivision Surfaces for Data Visualization', Chhandomy Mandal, Hong Qin and Baba Vmuri, 1997, IEEE paper 0–8186–8262–0/97, pp 371–377.*

Mandal, Qin and Vemuri, 'Dynamic smooth subdivision suffaces for data visualization', IEEE 97CB36155, Oct. 19, 1997, pp. 371–377.*

Thompson, J. F., et al., *Numerical Grid Generation Foundations And Applications*, pp. 1–6, New York, NY (1985).

* cited by examiner

Primary Examiner—Tariq R. Hafiz
Assistant Examiner—Lonnie A. Knox
(74) Attorney, Agent, or Firm—Ladas & Parry

(57) ABSTRACT

The method and system of discretisation according to the present invention addresses the problems of the different types of prior art grids. In particular, a problem for which a solution is found is that of the rigidity of the spatial distribution of the cells in a structured grid, implying undesired local thickening of cells, thus causing considerable waste in calculation time and memory. A method consistent with the present invention creates a semistructured grid. Further, a numerical solver needs to be adapted to handle the semistructured grid.

13 Claims, 17 Drawing Sheets

| Sub-blocks limits | | | | | | | |
|---|---|---|---|---|---|---|---|
| Ii | If | Ji | Jf | Ki | Kf | NJn | Semi-structured region |
| 1 | 2 | 0 | 0 | 0 | 0 | 13 | area aroud the axis |
| 3 | 3 | 0 | 0 | 0 | 0 | 31 | area aroud the axis |
| 4 | 4 | 0 | 0 | 0 | 0 | 43 | area aroud the axis |
| 5 | 5 | 0 | 0 | 0 | 0 | 55 | area aroud the axis |
| 6 | 18 | 0 | 0 | 1 | 17 | 48 | starting of the model and dome |
| 15 | 18 | 0 | 0 | 11 | 17 | 48 | outside the chamber |
| 16 | 18 | 0 | 0 | 18 | 39 | 48 | outside the chamber |
| 17 | 18 | 0 | 0 | 40 | 43 | 48 | outside the chamber |
| 1 | 2 | 0 | 0 | 39 | 43 | 7 | outlet, inner area |
| 3 | 3 | 0 | 0 | 39 | 43 | 13 | outlet, inner area |
| 4 | 4 | 0 | 0 | 39 | 43 | 19 | outlet, inner area |
| 5 | 5 | 0 | 0 | 39 | 43 | 25 | outlet, inner area |
| 6 | 6 | 0 | 0 | 39 | 43 | 31 | outlet, inner area |
| 7 | 7 | 0 | 0 | 39 | 43 | 37 | outlet, inner area |
| 8 | 8 | 0 | 0 | 39 | 43 | 43 | outlet, inner area |
| 9 | 9 | 0 | 0 | 39 | 43 | 49 | outlet, inner area |
| 9 | 13 | 1 | 13 | 41 | 43 | 7 | outlet, right outer rim |
| 9 | 13 | 37 | 61 | 41 | 43 | 13 | outlet, left outer rim |
| 9 | 13 | 85 | 97 | 41 | 43 | 7 | outlet, right outer rim |

FIG. 8

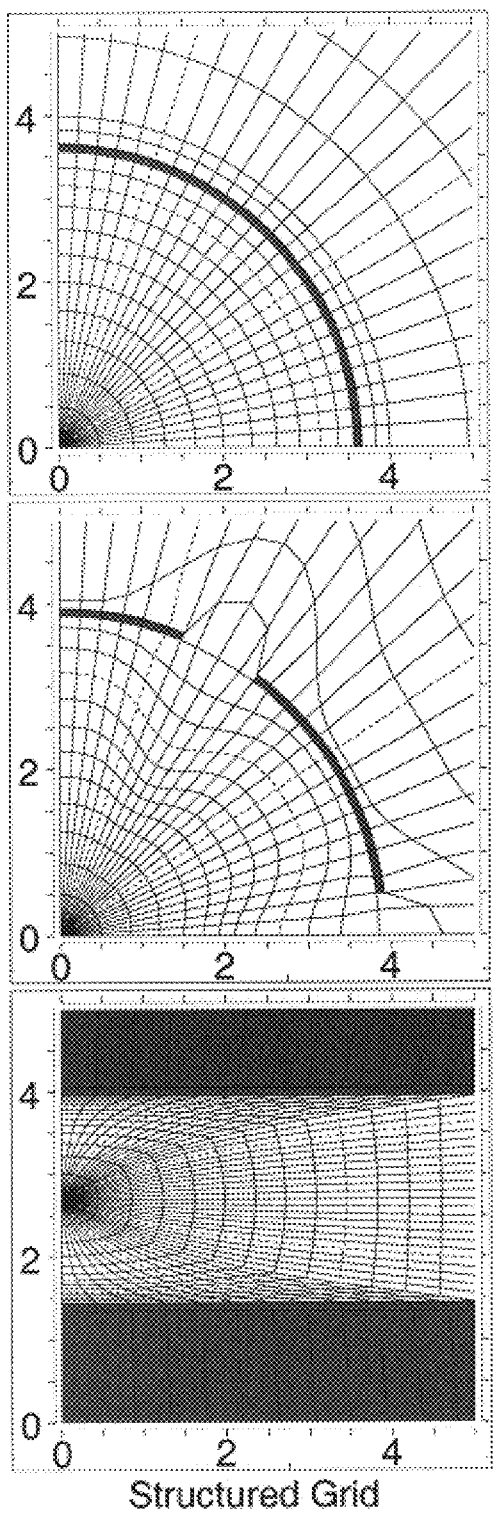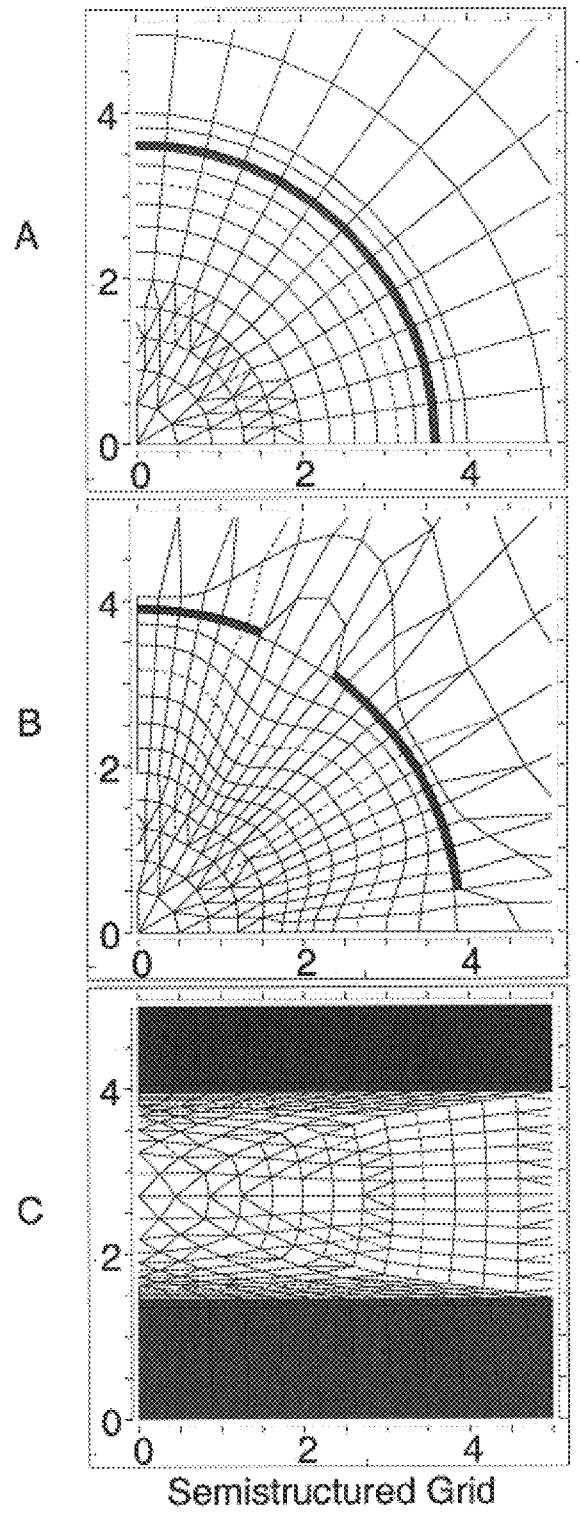
FIG.9

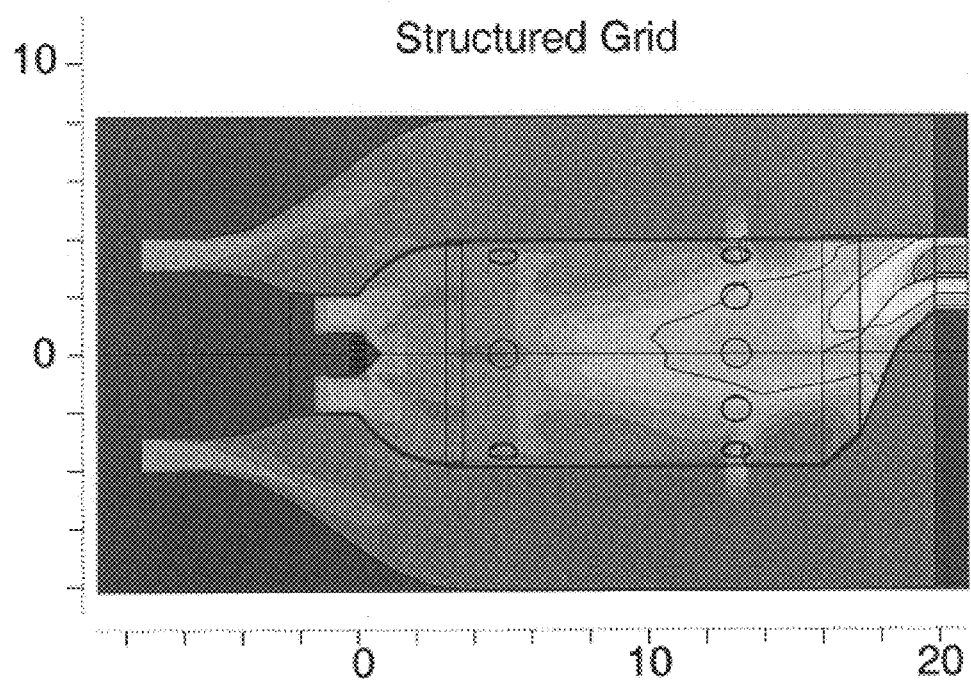
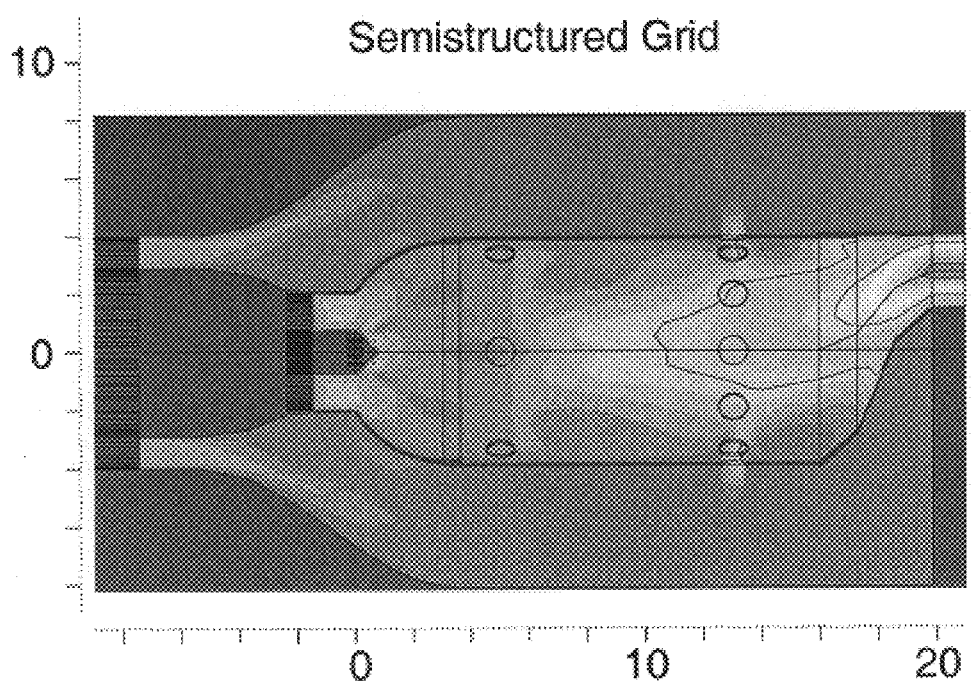
FIG.12

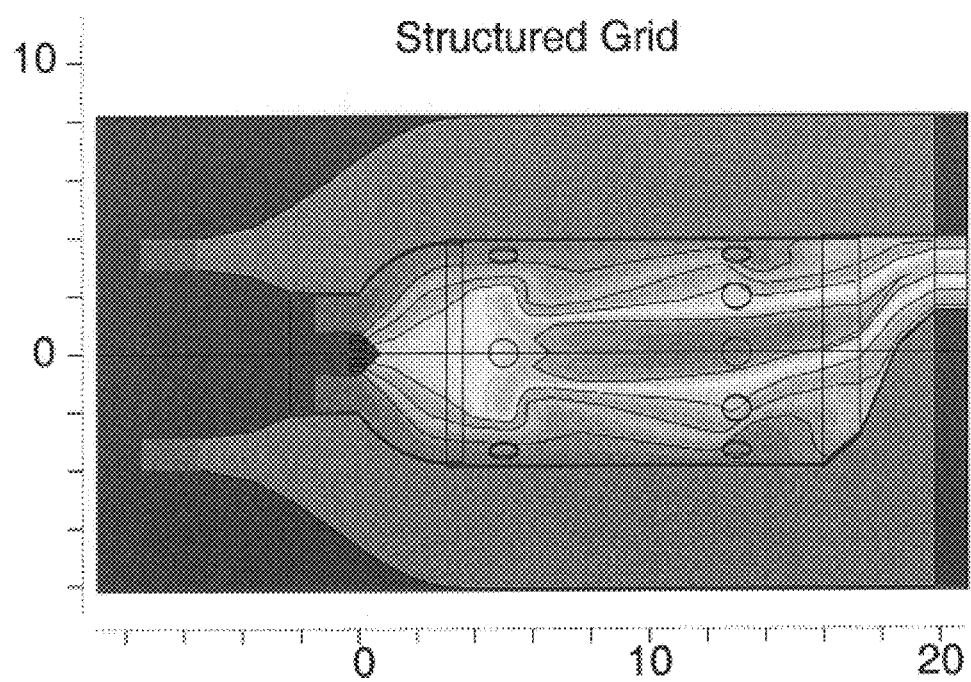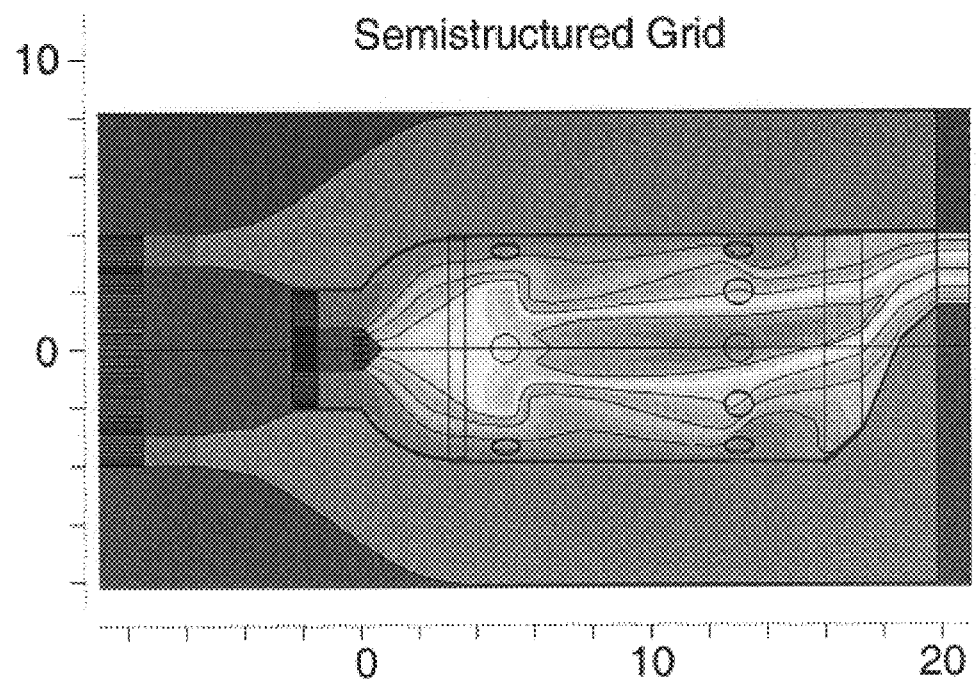
FIG.13

METHOD FOR THE REPRESENTATION OF PHYSICAL PHENOMENA EXTENDING IN A BI- OR TRIDIMENSIONAL SPATIAL DOMAIN THROUGH SEMISTRUCTURED CALCULATION GRID

BACKGROUND OF THE INVENTION

A. Field of the Invention

The present invention relates to a method for the representation of physical phenomena extending in a bi- or tridimensional spatial domain through a semistructured calculation grid.

B. Description of the Related Art

The representation of physical phenomena occurs by computerized numerical simulation of the spatial domain to be discretised. This operation, known as spatial discretisation, divides the spatial domain in a plurality of simple sub-domains to cover it, more or less accurately, throughout its extension.

Therefore, an approximation of a continuous domain composed of infinite points is obtained by a discontinuous domain composed of a finite number of elements, called cells.

In a two-dimensional space, the domain extends on a surface and the cells are polygonally shaped, whose sides, usually straight-lined, connect a set of vertices, also called nodes. In a three-dimensional space, the domain extends on a volume and the cells are polyhedrally shaped, delimited by faces. Each face is polygonally shaped, whose sides form the edges of the cell, connect a set of vertices.

The organized set of elements of different typologies (cells, vertices, sides, faces and edges) discretising the space of the calculation domain is a calculation grid. Each one of the elements forming a calculation grid is detected, within its typology, by a single global index. The various global indices relative to a certain typology are stored in vectors.

The numerical description of a calculation grid indicates for each vertex, the coordinates corresponding to its spatial position with respect to a predetermined reference system and the connectivity with the adjacent vertices, i.e., the way the vertices are connected therebetween through the sides of the polygonal cells (in the two-dimensional space) or through the faces of the polyhedral cells (in the three-dimensional space). The grids can be of different types according to their connective peculiarities.

A calculation grid is structured when its vertices are connected therebetween according to a same scheme throughout the calculation domain. In this case, the connectivity of the vertices is governed by the law with which they are ordered, i.e., it allows the determination of the global indices of the vertices adjacent therebetween.

A calculation grid is nonstructured when there is no ordering law among the vertices. In this case, it is necessary to indicate explicitly the connections of each vertex with the adjacent ones.

However, the use of each one of these types of grids causes practical problems, addressed by the development of intermediate typologies of grids, i.e., grids combined therebetween in ways that were different every time. However, these attempts failed to solve the problem.

With reference to FIG. 1, the representations of a simple bidimensional domain, such as the one formed by a quarter of a circle, will be shown.

The grids A and B are structured grids and are the most commonly used. The cells, usually quadrangular (hexahedral in the three-dimensional space), forming them and dividing the physical space, are in a biunivocal relation with the square cells (cubical in the three-dimensional space) obtained dividing, by two perpendicular and numerable sheaves of straight lines (three sheaves of planes in the three-dimensional space), a rectangle (a parallelepiped in the three-dimensional space) in the indicial space, called block. Therefore, the cells of the physical space are ordered by layers and are easy to localize considering the pair (the triad in case of three-dimensional space) of the directional indices i, j relative to the layers the cell belongs to. Furthermore, all the elements of the grid (cells, vertices, sides, faces, edges) are in biunivocal correspondence therebetween.

A peculiarity of the structured grids is demonstrated by the possibility of defining a global index ij starting from the directional indices i, j by an algebraic relation, in order to trace back the directional indices starting from the global one. As an example of the relation between the directional indices and the global index of a structured grid, reference can be made to the cell identified with an asterisk in the grid A. This cell is detected by the pair of directional indices (i,j) corresponding to (3,2). For example, its global index ij can be expressed by the following relation $$ij=NI*(j-1)+i=5*(2-1)+3=8$$

wherein NI is the total number of layers of vertices in the direction i, e.g., 5. From said relation it is possible to notice how vertices adjacent therebetween in the direction i (direction in the radial or horizontal generating line) differ by a unit in the value of their global index, where vertices adjacent therebetween in the direction j (direction of the azimuthal or vertical generating line) differ by a value NI in the value of their global index.

The structured grid A, hereby called cylindrical structured grid, is the most natural and easiest to construct, but has the drawback of an excessive thickening of the meshes towards the center. This drawback, besides an evident waste of cells and therefore of memory, involves an inevitable thinning of the dimension of the cells. In certain cases, this could considerably increase the calculation time because of the need of drastically reducing the time step to respect, for example, the stability criterion of Courant.

The structured grid B, hereby indicated as Cartesian structured grid, does not involve the above mentioned drawback, but its construction is more complicated and in particular it shows a strong nonhomogeneity along the direction j with excessively deformed cells such as those placed along the diagonal of the indicial space. The nonhomogeneity makes the creation of a mathematical model extremely difficult.

The structured grid C, also known as multiblock structured grid, tries to solve all the above mentioned problems. The grid is formed by more blocks (rectangular in two dimensions or parallelepiped in three dimensions) differently connected. However, its modelization creates new problems. First, the localization of the cells requires the use of an additional index, besides the directional ones, to identify the single block taken into consideration, second, more complicated calculation schemes are necessary. This modelization requires in each direction, the knowledge of the values in the cells upstream and downstream of the current cell.

The grid D is nonstructured, composed of triangular cells (tetrahedral in the three-dimensional space). An advantage given by the use of nonstructured grids is that of being able to control at will the thickening of the cells in the domain without worrying about the limits imposed by the structure ordered by layers of cells, as it is necessary in a structured grid. However, the nonstructured grid has several drawbacks caused essentially by the lack of a natural correspondence with an indicial space. Among the drawbacks, the following can be considered:

1) besides the matrix of the physical coordinates of the vertices, whose data are casually recorded not being possible, in this case, to order them according to an index ordered by layers, it is necessary to define a connectivity matrix (CM) indicating for each cell the 3 nodes (4 in the three-dimensional space) forming the vertices thereof;

2) localizing each physical element (cell or vertex) in the grid cannot be easily obtained through the relative structural indices and requires the use of maps on which they are numbered one by one;

3) it is difficult to use numerical schemes of an order higher than the first, i.e., taking into consideration together with the values of the quantities in the reference cells and in those immediately adjacent to them, also the values of the quantities in the cells adjacent to the latter;

4) identifying afterwards, e.g., after the construction of the grid, subdomains that can be given some characteristics, is complicated, if not impossible: for example, to delimit a wall portion to which a determined temperature is to be imposed and in absence of a specific law for ordering the vertices, it would be necessary to list all the indices of all the cells comprised therein;

5) similar or even more complicated problems are evident when the results have to be visualized: the visualization of the structured grids is performed following the layers identified by the indices, while for the nonstructured grids it can occur only for analytically defined physical surfaces, e.g., planes. This requires a complicated procedure which includes the individuation of a visualizing grating on the chosen surface and the determination in the vertices of the values of the quantity to be visualized by interpolation with the values of the grid cells closest to said vertices;

6) finally, the nonstructured grids based on triangular elements require often a greater number of cells with respect to the structured ones, as, while for the quadrangular cells of the structured grids considerable elongations are permitted and therefore they can be thickened next to the walls only in a direction perpendicular to them, not always the sides of the triangular cells can be so different therebetween, so that a thickening in a direction can involve a similar thickening in the orthogonal directions. In the three-dimensional space, such a thickening involves a cubic increase in the number of the cells.

This last drawback can be overcome using hybrids grids E, also represented in FIG. 1, wherein the domain is divided in two types of regions, depending if the discretisation in the cells therein is performed by nonstructured grids or structured grids. The latter are as a rule used in regions adjacent to the walls. These grids, proposed to overcome the drawbacks shown singularly by both the types of grids composing them and that have also been adopted in commercial codes, actually gather all the problems explained up to now. In fact, they require numerical solvers able to manage the structural peculiarities of both the grids without solving, rather worsening, the problems of the localization of the cells and of portions of the calculation domain as well as of data visualization.

Accordingly, there is a need to improve simulation of structuring grids in different industrial and technological areas, e.g. all those wherein a numerical simulation of a physical phenomenon extending in the space can be performed. Furthermore, there is a need to reduce memory usage and reduce calculation time for creating a structured grid.

SUMMARY OF THE INVENTION

The method and system of discretisation according to the present invention addresses the problems of the different types of prior art grids. In particular, a problem for which a solution is found is that of the rigidity of the spatial distribution of the cells in a structured grid, implying undesired local thickening of cells, thus causing considerable waste in calculation time and memory. A method consistent with the present invention creates a semistructured grid. Further, a numerical solver needs to be adapted to handle the semistructured grid.

Methods, systems and articles of manufacture consistent with the present invention, as embodied and broadly described herein, provide a system and method for the representation of physical phenomena extending in a bidimensional (or tridimensional) spatial domain, carried out starting from an initial discretisation of the spatial domain performed by a structured calculation grid. The grid provides a division of the domain into cells, each cell being delimited by sides (or polygonal faces), each side (or face) being obtained by joining a set of vertices. The vertices being placed on two or three ordered sheaves of layers of the vertices. The layers evolving in two or three indicial directions so that each of said vertices is detected by a pair or triad of indices representing the two or three layers it belongs to.

The method is characterized in that it uses semistructured calculation grids, obtained through a semistructuring process comprising the following steps:

1) detecting one or more sub-blocks, each sub-block being formed by the set of the vertices of the grid comprised, for each one of the two (or three) indicial directions, between a pair of layers of vertices evolving in said indicial direction;

2) fixing for each sub-block an indicial direction for grouping the vertices, called semistructuring direction, said direction detecting a sheaf of sub-meshes in said sub-block, each sub-mesh of said sheaf consisting in a number of vertices lined along the semistructuring direction in the same number of distinct initial positions;

3) predetermining for each sub-block a number of distinct final positions lower than the number of distinct initial positions, in which the vertices for each sub-mesh are to be grouped; and 4) grouping for each sub-block the vertices of each sub-mesh in said number of different final positions, as to obtain the same number of different vertices for each sub-mesh of the sub-block, detecting at the same time, for each sub-block, a set of virtual vertices corresponding to the difference between the initial and the final number of vertices of that sub-block.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings, FIG. 1, already described in detail, shows a plurality of representations of prior art structured and nonstructured grids;

FIG. 8 shows a table for the application on the standard heater of the semistructuring method consistent with the present invention;

FIG. 9 shows a plurality of comparative views among representations of the standard heater by structured grid and by semistructured grid;

FIGS. 12 to 15 show comparative quality maps between the application to the standard heater of the structured grid and the semistructured grid method.

DETAILED DESCRIPTION

Reference will now be made in detail to an implementation consistent with the present invention as illustrated in the accompanying drawings. The description includes exemplary implementations, other implementations are possible, and changes may be made to the implementations described without departing from the spirit and scope of the invention. Wherever possible, the same reference numbers will be used throughout the drawings and the following description to refer to the same or like parts.

Introduction

Figure 1:
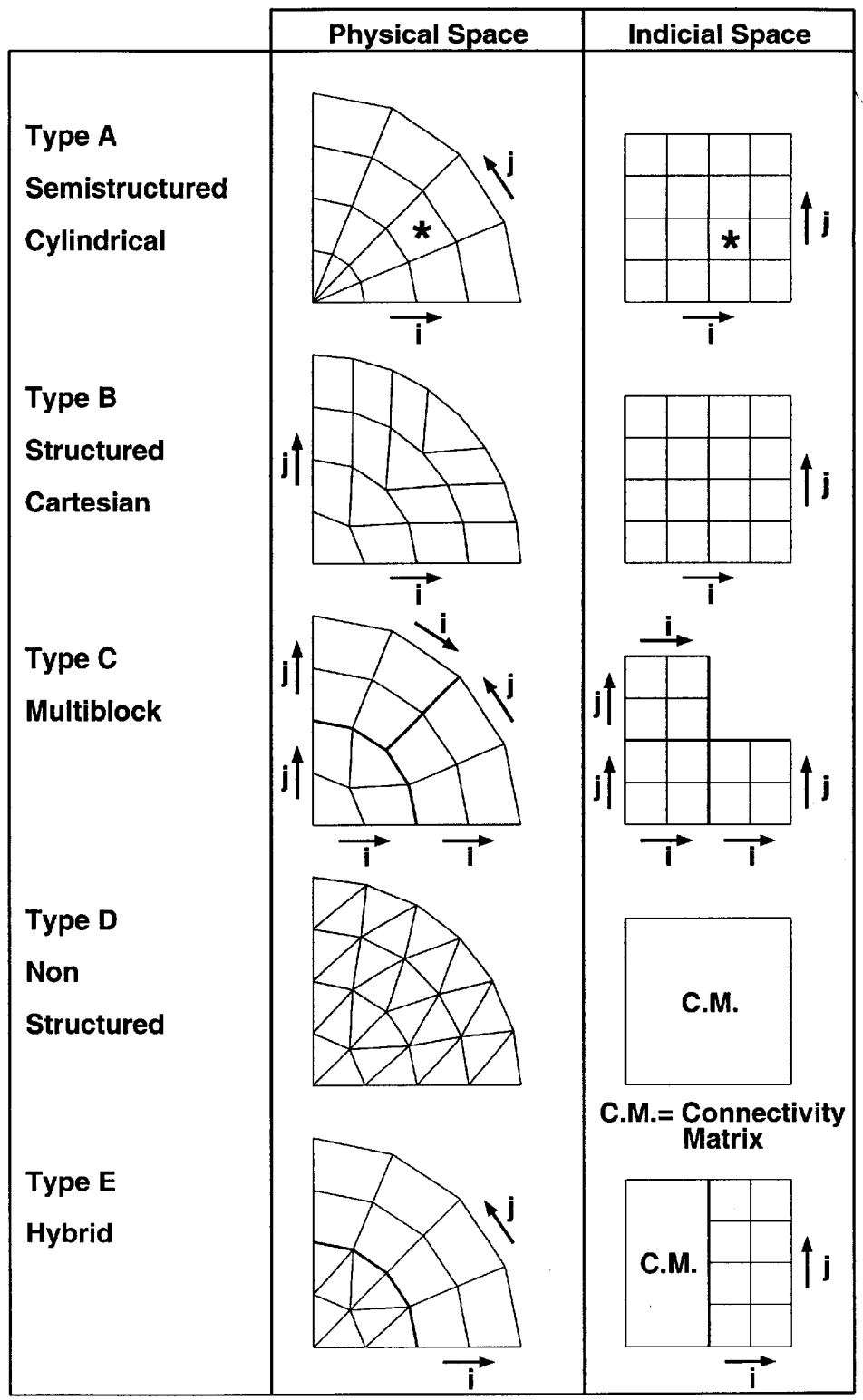
Figure 2A:
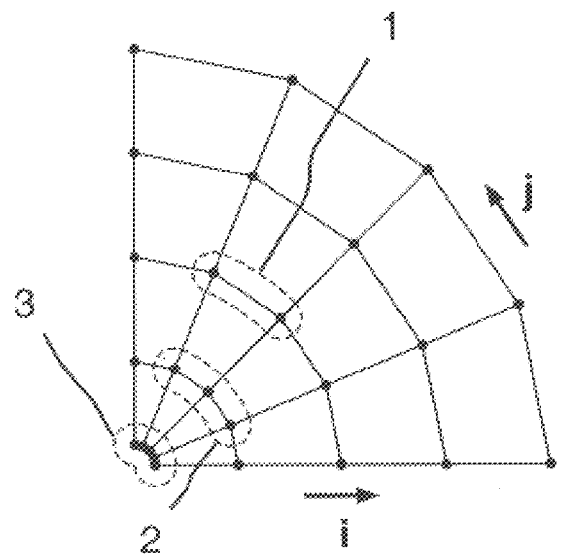
FIGS. 2A–2C show an example of generation of a semi-structured grid consistent with the present invention.

FIG. 2A shows how the semistructured grid originates from a structured grid similar to grid A in FIG. 1. FIG. 2A shows how the method consistent with the present invention groups some vertices, for example only along the azimuthal direction j, as to make them coincide in one position; in particular, the regions 1,2,3 shown in a dashed line are grouped. The grouping operation generates the semistructured grid in FIG. 2B, whose multiple vertices, corresponding to the previously grouped initial vertices, represented side by side but actually coincide, comprise a distinct final vertex (represented with a black dot) and one or more coincided vertices (represented with a white dot). For calculation purposes, the white dots becomes a virtual vertex for which no physical quantity is associated. However, the presence of said virtual vertices allows the preservation of the grid structure, as it can be easily noticed from the subsequent FIG. 2C. In fact, although the look of the semistructured grid is that of a nonstructured grid with quadrilateral/triangular mixed elements, the representation in the indicial space i,j makes the keeping of the layered structure evident. Therefore, this makes it possible to take advantage both of the arbitrariness of the thickening, typical of the triangular nonstructured grids, and of the directional thinning, typical of the quadrangular cells (hexahedral in the three-dimensional space).

The keeping of the structure maintains the possibility of an easy localization of the grid elements and an easy definition of the domain portions. The visualized layers are complete even if they include virtual elements (virtual cells, faces or sides) as the quantity to be visualized assumes the values of the real elements coinciding thereto, or the average of the values of the immediately adjacent real elements.

A semistructured grid can be represented preferably according to two different ways:

1) indicating the position of all the vertices, also the coincident ones, as it was a normally structured grid; in this case, the detecting of the coincident vertices would occur according to the coincidence of the values of the respective coordinates;

2) adding to the three vectors (in the three-dimensional space), necessary to assign the physical coordinates, a vector indicating, for each vertex, the position expressed by the global index, of the distinct vertex with which it coincides. In this situation, the memory space required for the fourth vector would be compensated by the smaller memory space required for the 3 vectors of the coordinates, that have to be dimensioned according to the distinct vertices only.

When modifying already known calculation programs dealing with structured grids to make them suitable to treat semistructured grids, it is necessary to add some connectivity matrixes defining the adjacencies among the real elements of the semistructured grid. These matrixes are similar to those used in the representation of nonstructured grids. However, in this case, the semistructuring still allows to operate along the three orthogonal directions of the indicial space, always detecting, for each one of these directions and for each real element of the grid, the values of the nearby upstream and downstream real elements. This allows the use of conceptually simple and accurate spatial differentiation schemes.

Figure 2B:
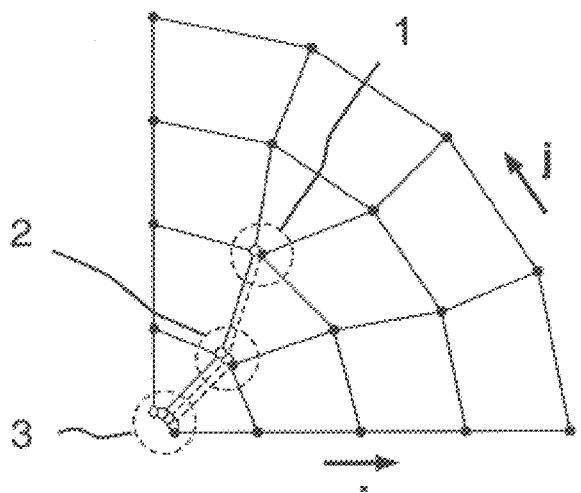
Figure 2C:
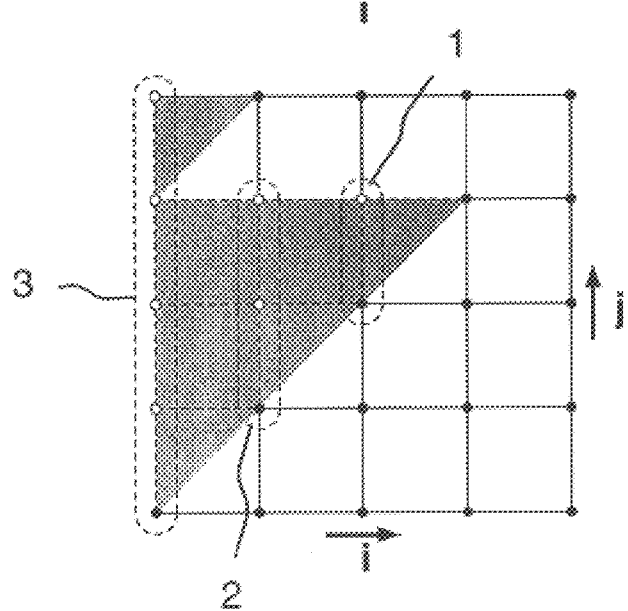

The grouping of the vertices, which in the example in FIGS. 2A–2C was conducted in just one direction (the azimuthal one) can also be conducted in the other two directions, therefore allowing a further saving in cells and calculation time.

Furthermore, the semistructuring allows to thicken or thin a structured grid locally, by the detection of a subset of vertices to be grouped, without having to do it in the whole extension of the concerned layers, thus drastically limiting the growing in the number of calculation vertices. This operation can be easily performed during the execution of the calculation, allowing therefore the easy realization of auto-adaptive grid codes.

The code to implement the method according to the present invention has to be modified to skip possible virtual elements until a real element is reached. Such a search, repeated for all the calculations cycles and for all the elements of the grid, would waste too much time. Therefore, the code is modified as to perform the skip only once at the beginning of the calculation.

Semistructured Grids

The method according to the present invention can suit many industrial and technological areas, e.g., all those wherein a numerical simulation of a physical phenomenon extending in the space can be performed. Here below, a preferred embodiment as a nonlimiting example of its several applications will be described. This was performed in one of its possible application areas, i.e., thermofluidodynamics (TFD). The object of the simulation is that of reproducing numerically the spatial evolution of the TFD quantities (e.g., speed, temperature and viscosity) inside a tridimensional physical domain wherein a fluid flows.

The TFD quantities are related through basic differential equations, which are solved by a calculation program, called simulation code or numerical solver, which makes use of the integration methods developed to said purpose in the theory of numerical calculation. To allow the numerical representation of the TFD quantities within any solver, the physical space must be discretised by a grid of the kind that can be treated by the particular integration method used by the numerical solver.

Figure 3A:
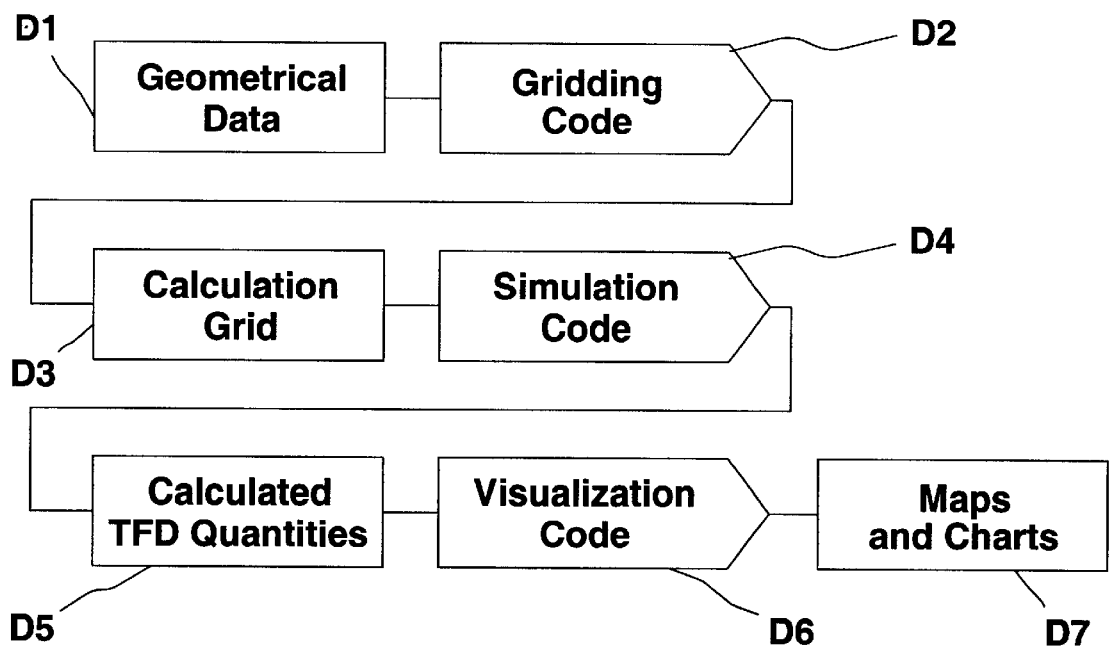
FIG. 3A shows a general process for a prior art TFD calculation.

The general procedure known from the state of the art for a TFD calculation is shown as an example in FIG. 3a. FIG. 3a represents a sequence of steps for numerical simulation as described in numerical grids, by J. F. Thompson, North Holland, 1985. From the geometrical data (D1) of the component to be simulated, a calculation grid from a gridding code (D2 and D3) is obtained. The calculation grid is read together with the other input data necessary to define the boundary and initial conditions, by a simulation code (D4). The values relative to the TFD quantities calculated in every element of the grid and stored in output with a determined ordering depending on the type of grid (D5), can be consulted through visualizing codes (D6) to obtain graphs or bidimensional maps of said quantities.

Figure 3B:
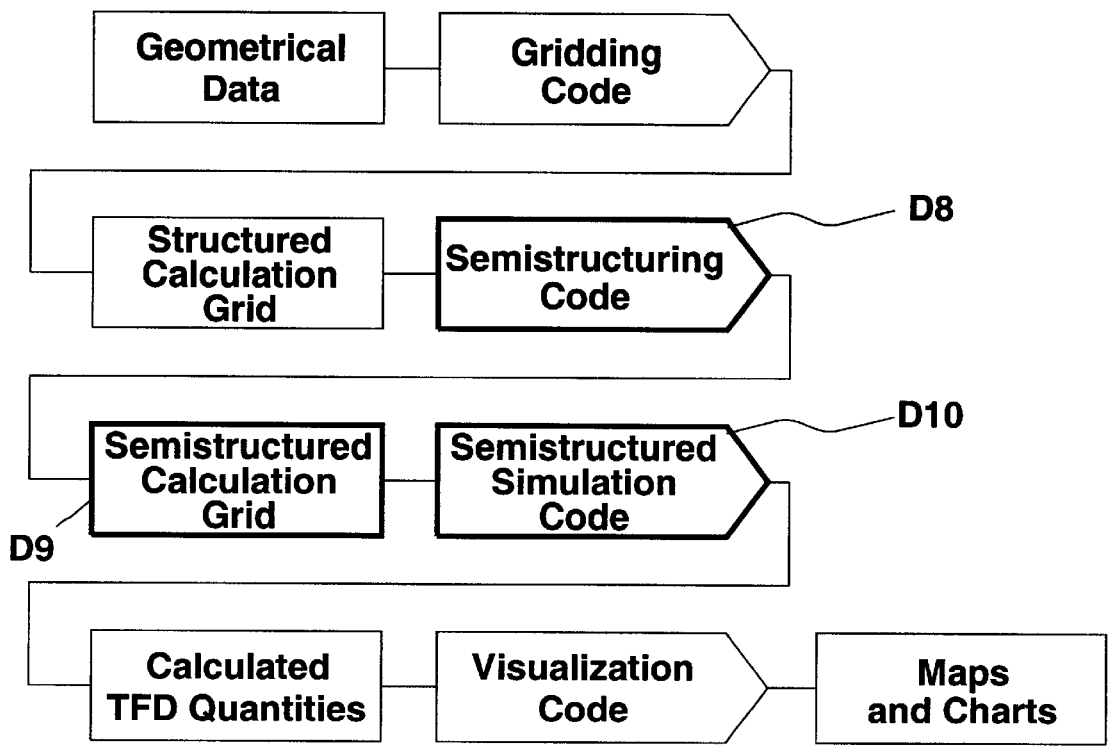
FIG. 3B shows a general process for a TFD calculation consistent with the present invention.

The use of semistructured grids implies a variation in the above mentioned procedure, leading to two additional steps (FIG. 3B):

1) The calculation grid must be modified through semi-structuring (D8, D9); and
2) the numerical solver (D10) must be adapted to calculate the semistructured grids.

Before explaining the specifics of D8 to D10, and the explanation of the semistructuring process according to the present invention, it is useful to clarify in the successive FIGS. from 4A to 4D the meaning of some of the terms used.

Figure 4A:
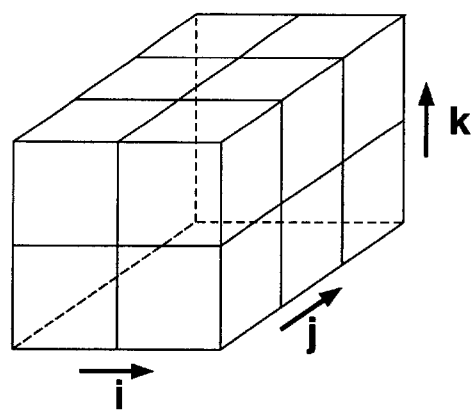
FIGS. 4A–4D show representations of a tridimensional structured grid in the indicial space.
Figure 4B:
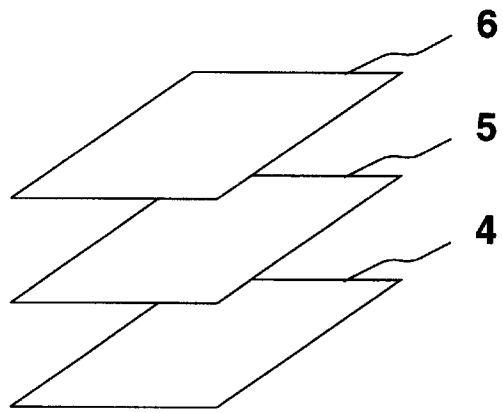
Figure 4C:
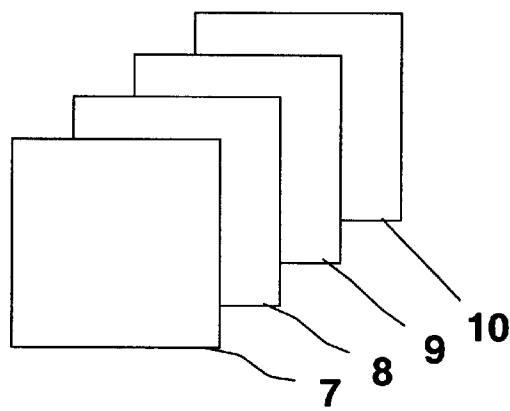

The FIG. 4A shows the representation in the indicial space of a tridimensional structured grid. Each one of the indicial directions i,j,k detects a sheaf of layers of vertices perpendicular thereto. In FIG. 4B, the 3 layers of vertices 4, 5 and 6 stratified according to the direction k are represented, whereas in the FIG. 4C the 4 layers of vertices 7, 8, 9 and 10 stratified according to the direction j are represented. Therefore, a layer of vertices is a bidimensional element of the grid as it extends in the two indicial directions which are perpendicular to the stratification direction. The layer of vertices is detected by the indicial stratification direction of the sheaf to which it belongs and by the ordering number of the layer in that sheaf.

Figure 4D:
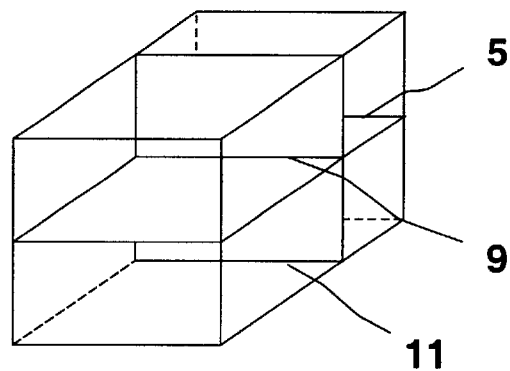

The intersection between each layer j and each layer k detects a set of vertices lined according to the direction i, called mesh. In the example of FIG. 4D, the mesh is formed by vertices belonging at the same time to the layer j 9 and to the layer k 5. The set of meshes obtained by the intersections of each layer j with each layer k forms the sheaf of meshes oriented according to the direction i. Therefore, a mesh is a monodimensional element of the grid as it extends along a direction, the one perpendicular to both layers intersecting therein. It is detected by the indicial direction in which it develops and by the indices of the two layers intersecting therein.

Semistructuring Process

Figure 3C:
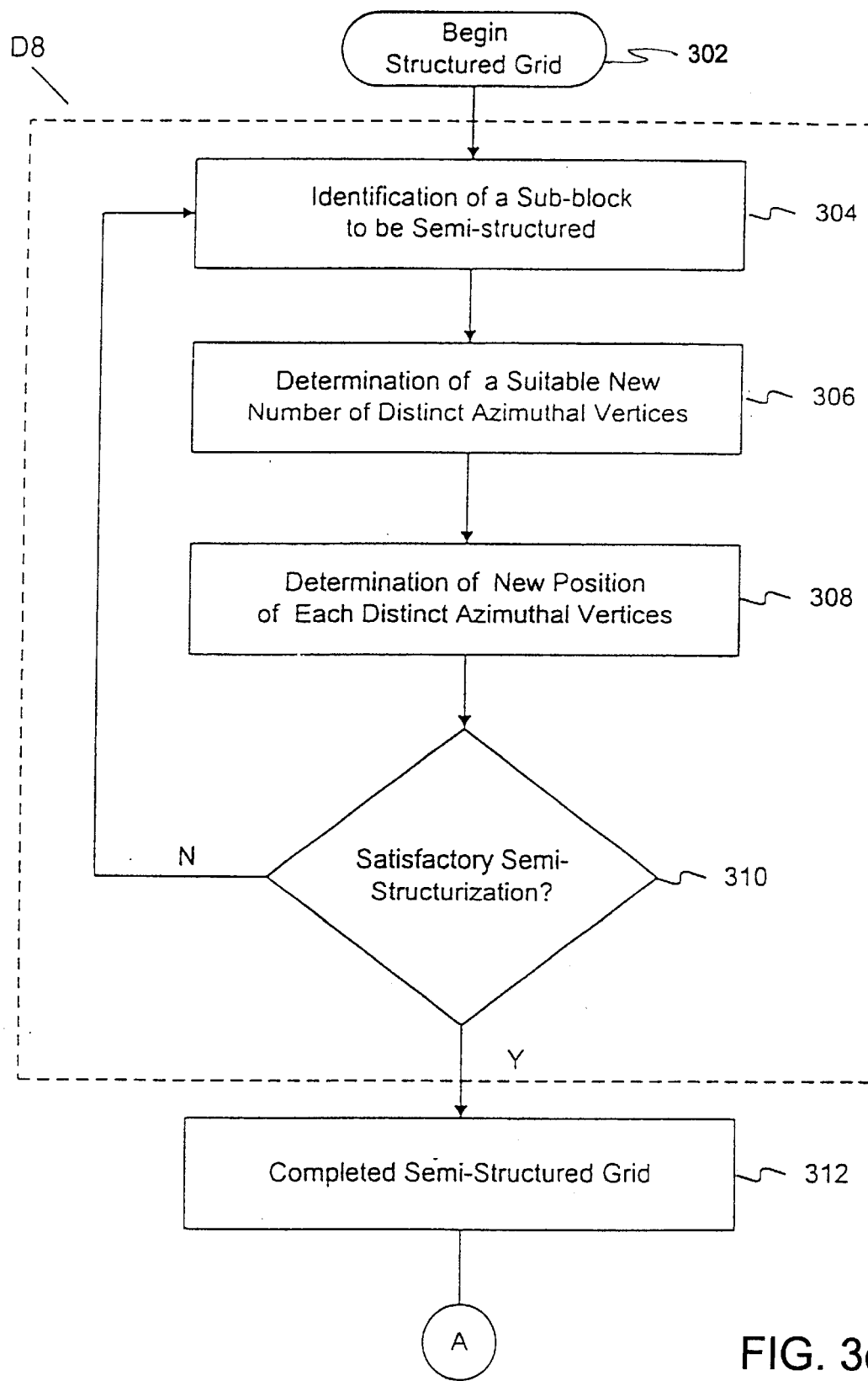
FIG. 3C shows a process for semistructuring the structured grid.

FIG. 3c depicts a more detailed diagram of the semistructuring process (D8). Initially, the semistructuring process must obtain a structured grid for modification (step 304. Once obtained, semistructuring process D8 then iterates through different parts of the initial structured grid by varying the number of new azimuthal vertices until a satisfactory semistructured grid is obtained (steps 304 to 310). The part of the initial grid involved in one iteration of the semistructuring process is called a sub-block. The sub-block is formed by the vertices comprised among three pair of layers, for example a pair for each indical direction. Each pair of layers represents, for a determined indicial direction, the initial and the final layer of vertices of the considered sub-block.

Figure 5A:
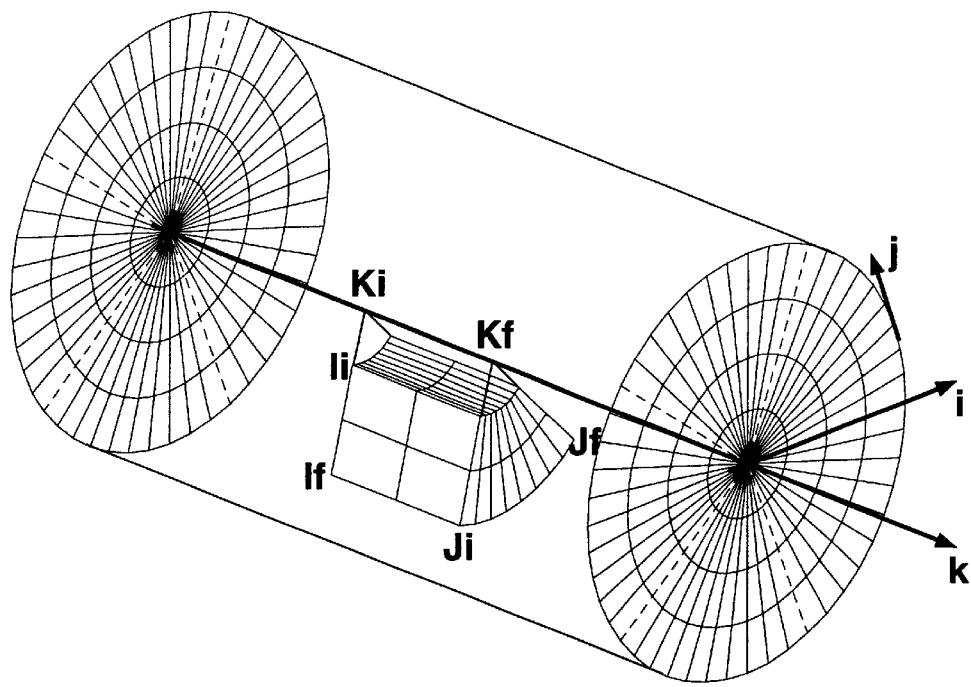
FIG. 5A is a schematic view for the determination of a sub-block in the calculation domain on which semistructuring has to be performed.

In one iteration, semistructuring process D8 identifies a subset of the initial vertices determined by the identification of sub-block of the calculation domain (step 304). FIG. 5a demonstrates an example of each of the 3 directions when two indices are specified, which are the initial and final index of the planes of vertices delimiting the sub-block: Ii, If, Ji, Jf, Ki, Kf.

Once a semistructuring direction has been fixed, the portions of the meshes belonging to the sheaf of meshes oriented in that direction, comprised in the sub-block, are called sub-meshes. The semistructuring process consists of an adequate reduction of the initial number of the distinct vertices comprised in each sub-mesh by the grouping of groups of consecutive vertices belonging to the same sub-mesh. Considering that usually the position of said vertices differs from mesh to mesh, the grouping of the vertices is to be repeated for each sub-mesh.

Semistructuring process D8 then determines the final (or new) number of distinct azimuthal vertices (NJn) in which the initial vertices will be grouped along the azimuthal meshes comprised in the sub-block (step 308). NJn will be lower than the initial (or previous) number of azimuthal vertices (NJp) in the sub-block:

$$NJn < NJp(=Jf-Ji+1).$$

Figure 5B:
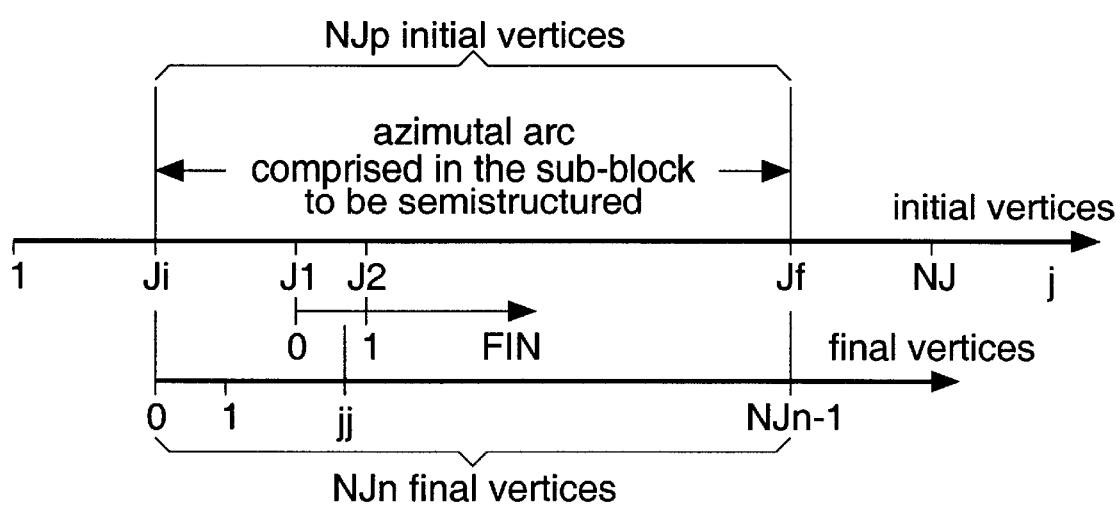
FIG. 5B shows a scheme for the interpolation of the initial vertices of a structured calculation grid.

At the same time, a reduction factor from initial to final vertices, is defined according to the formula:

$$FRID = 1.0*(NJp-1)/(NJn-1),$$

wherein the multiplication by 1.0 is to avoid, in certain compilers, that FRID is rounded off to the lower integer;

In the last step of one iteration, semistructuring process D8 determines the new position of each distinct azimuthal vertice (step 308). An example of step 308 is shown in FIG. 5 by the following interpolation process of the initial vertices, wherein for each vertex located on the arc of the mesh comprised in the sub-block, i.e., for each initial index j from Ji to Jf, we have:

c1)

$$jj=NINT((j-Ji)/FRID)$$

wherein:
  the operator NINT (Nearest INTeger) gives back the integer value nearest to the one calculated; and
  jj is the index of the new vertices, counting only the distinct vertices starting from the first vertex subsequent to the initial vertex of the sub-block from jj=0 to jj=NJn−1. In fact, some indices will be identical, indicating therefore the presence of multiple vertices. Of said multiple vertices only one will be considered as real vertex to the calculation purposes;

c2)

$$j1=Ji+INT(jj*FRID)$$
$$j2=j1+1$$

wherein:
  j1 and j2 are the indices of the initial vertices immediately upstream and downstream the new position of the vertex having j as initial index;

c3)

$$FIN=MOD(FRID*jj,1.0)$$

wherein FIN is the interpolation factor between j1 and j2 and MOD (a, b) is the module function, that associates to a pair of integers (a,b) the value of the remainder of a/b. In other words, the value of FIN, which is in any case lower than 1, represents the indicial distance between the final vertex jj and the initial vertex immediately upstream;

c4)

$$Xn(j)=X(j1)+FIN*(X(j2)-X(j1))$$

wherein:
  X indicates each of the three Cartesian coordinates (X,Y,Z) which express the initial position of the vertices;
  Xn indicates each of the three Cartesian coordinates (X,Y,Z) which express the new position of the vertices.

Semistructring process D8 repeats steps 304 to 308 for different sub-blocks until a satisfactory semistructured grid is achieved (step 310). Thus, it is possible to adapt the degree of local semistructuring to the specific needs of each region of the calculation domain. Once the semistructurizing is completed, the completed grid may be sent to be processed by the numerical solver D10 (step 312).

In the preferred embodiment, the semistructuring process D8 is obtained only in the azimuthal direction, the most favorable in case of cylindrical calculation domains. This occurs according to the following process, represented referring at the same time to FIGS. 5A and 5B, starting from a monoblock structured grid (for ease of representation), whose elements are organized in layers according to the indices i (radial), j (azimuthal) and k (axial):

Numerical Solver

Figure 3D:
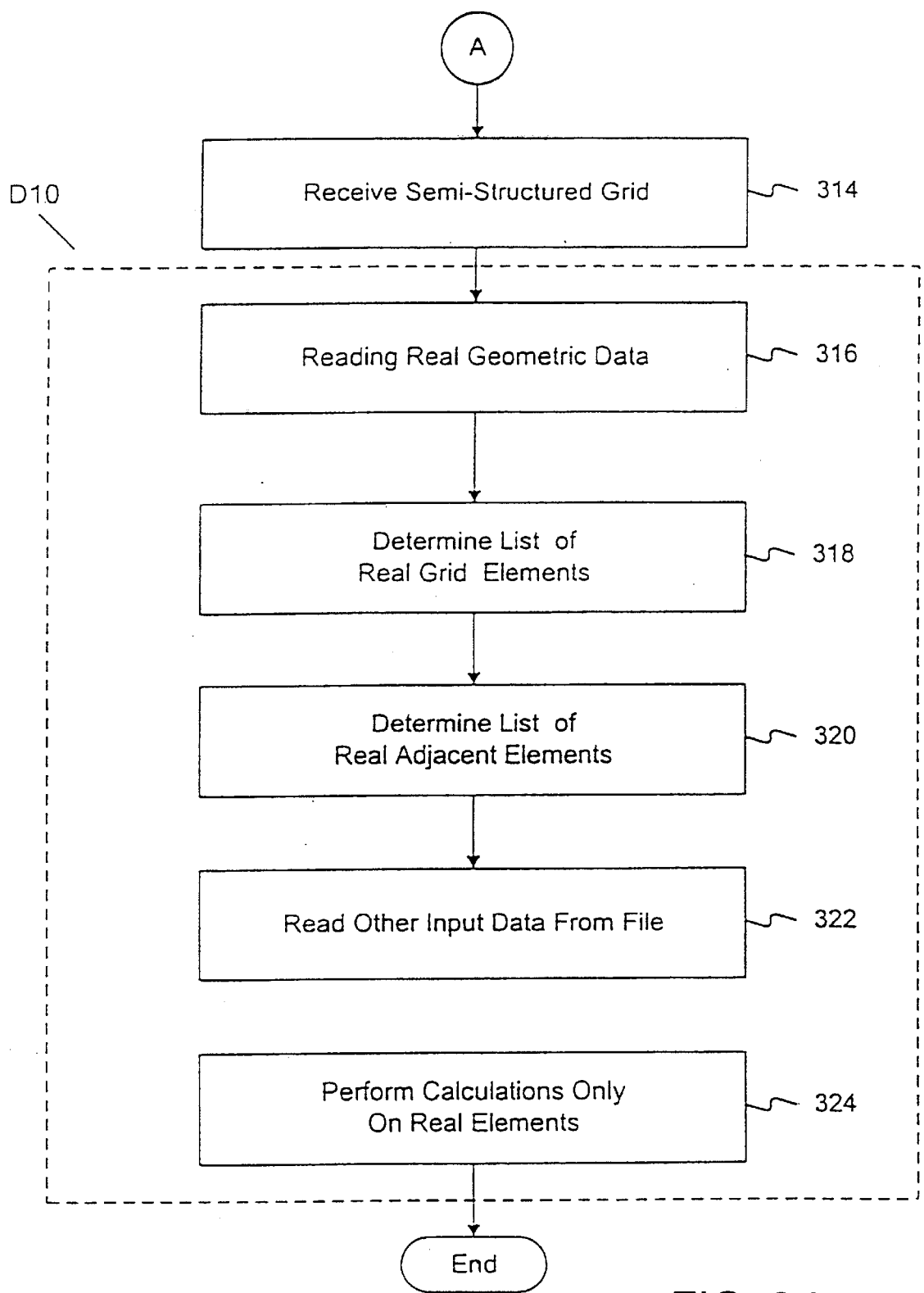
FIG. 3D shows an adapted numerical solver to process the semistructured grid.

FIG. 3d depicts a more detailed diagram of the numerical solver process D10. Once the semistructuring process has completed, the semistructured grid is received by the numerical solver process D10 (step 314) for generating simulation suitable for the treatment of the semistructured grids. The semistructuring process D8 has been made in a thermofluidodynamics finite-volumes compressible code. In the prior art codes, the internal calculation cycles scroll the elements of the domain by following the order of the global index. For each of said elements, its own global index and that of the adjacent elements are determined by simple algebraic relations as already mentioned above. In a monoblock structured grid with dimensions NI, NJ, NK, the global index ijk corresponding to an element situated in correspondence of the layers (i,j,k) is given by:

$$ijk=(k-1)*NI*NJ+(j-1)*NI+i$$

whereas, the global indices of the elements that for each direction i, j, k are adjacent upstream (m) and downstream (p) to any element ijk are given by the following relations:

im=ijk−1; jm=ijk−NI; km=ijk−NI*NJ
ip=ijk+1; jp=ijk+NI kp=ijk+NI*NJ

In a semistructured grid the above indices could indicate a virtual element to which no value of a physical quantity is associated. Therefore, a modified numerical solver process D10 is needed to implement the method according to the present invention in order to skip possible virtual elements until a real element is reached. However, such a search repeated for all the calculations cycles and for all the elements of the grid would waste too much time. Therefore, the numerical solver process D10 according to the present invention, performs the calculation just once at the beginning of the calculation according to the following process:

First, the geometric data from the semistructured grid is read and stored into memory (step 316). Once the data has been stored, the numerical solver process D10 determines only the list of the global indices of the real elements by the following equation (step 318):

$$ijk=LIJK(ir),\ for\ each\ ir=1,\ NR$$

wherein:
  NR is the number of the real elements only; and
  ir is the index of the real elements.

Once the list of real elements is determined, numerical solver process D10 successively determines the lists of the adjacent elements for each direction (step 320):

im=LIM(ir); jm=LJM(ir); km=LKM(ir)
ip=LIP(ir); jp=LJP(ir); kp=LKP(ir)

The vectors LIJK, LIM, LIP, etc. are determined for each type of element involved in the calculation (cells, vertices, faces). This requires the reading and storing of input data, other than the grid data. The other input data is required for case definition and execution of subsequent calculations (step 322). Preferably, the other input data is contained in a separate file from the current grid. The addition of some vectors besides those already present in a structured code will result in greater memory occupation. However, considering that all the vectors relative to the physical quantities are dimensioned only with respect to the number of real elements (NR) and not anymore with respect to all the elements of the block (NIJK=NI*NJ*NK), the numerical solver process D10, according to the present invention, allows a considerable reduction in memory occupation. Finally, numerical solver process D10 executes calculations related to the specific case performed only on the real elements (step 324). That is, the cells having a non-nul volume and for the noncoincident vertices and faces.

Example of Semistructured Application

The method of semistructuring D8 and the TFD numerical solver D10 previously described were successfully applied in the simulation of different experimental and industrial components, thus showing the efficiency of the method of the present invention in time and calculation saving as well as in reduction of memory occupation.

One of these applications, relative to an experimental heater of a particularly complex geometry, called hereinafter standard heater, will be described here below.

Figure 6:
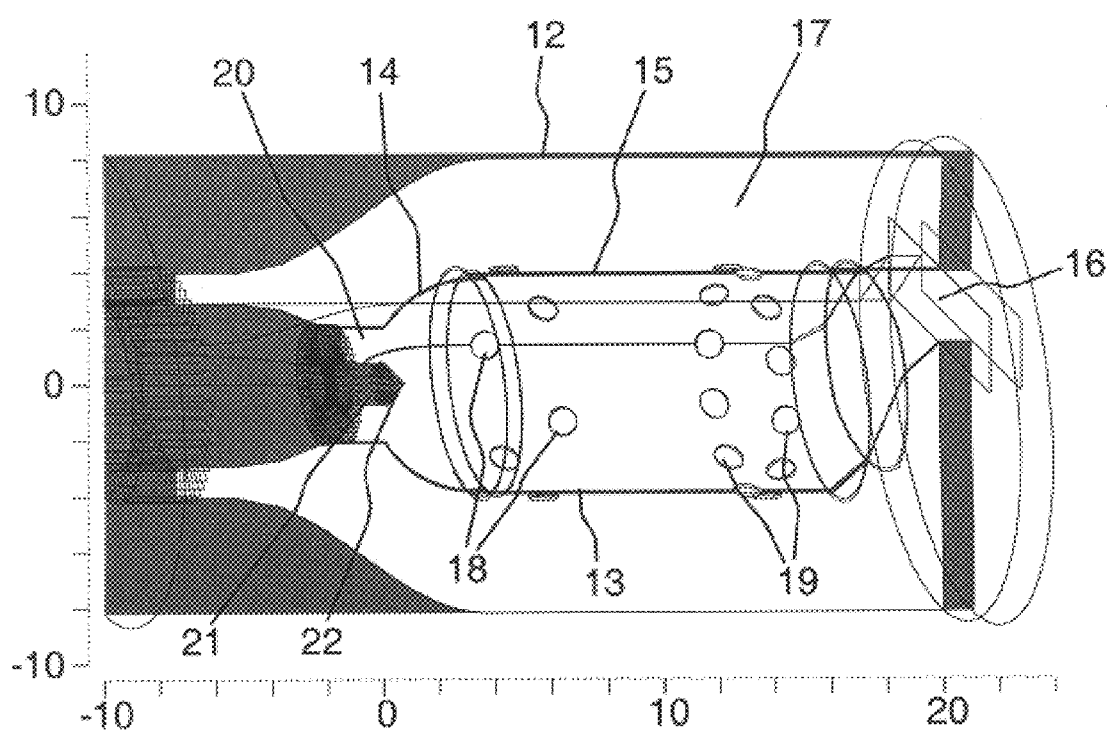
FIG. 6 shows a partial axonometric view of a standard heater.

Referring to FIG. 6, a partial axonometric view of the standard heater is represented, indicated as a whole with 12. it comprises a cylindrical chamber 13 having an initial hemispherical region 14 (the dome), a central portion 15 and an outlet region 16, rectangular in section. The chamber 13 is contained in a substantially cylindrically-shaped outlet duct 17 conveying the outer combustion air toward two lines 18, 19 of lateral holes situated on the shell of the chamber 13. The primary air is inputted through a toroidal duct 20 that outlets in the dome 14. The motion of this air has a helicoidal component given by an array of blades placed in the toroidal duct 20. At the center of said duct 20 there is a lance 21 having fuel inlet nozzles on its conical top 22.

Because of the complexity and the conformation of this geometry, the use of cylindrical structured grids is preferable. Furthermore, the presence of the vorticity of the motion and the outlet rectangular region 8 alter any axial symmetry therefore preventing the limitation of the calculation domain to only one sector of the component. Therefore, the geometry of the component has been modeled through a cylindrical structured grid extending to the whole section.

Figure 7:
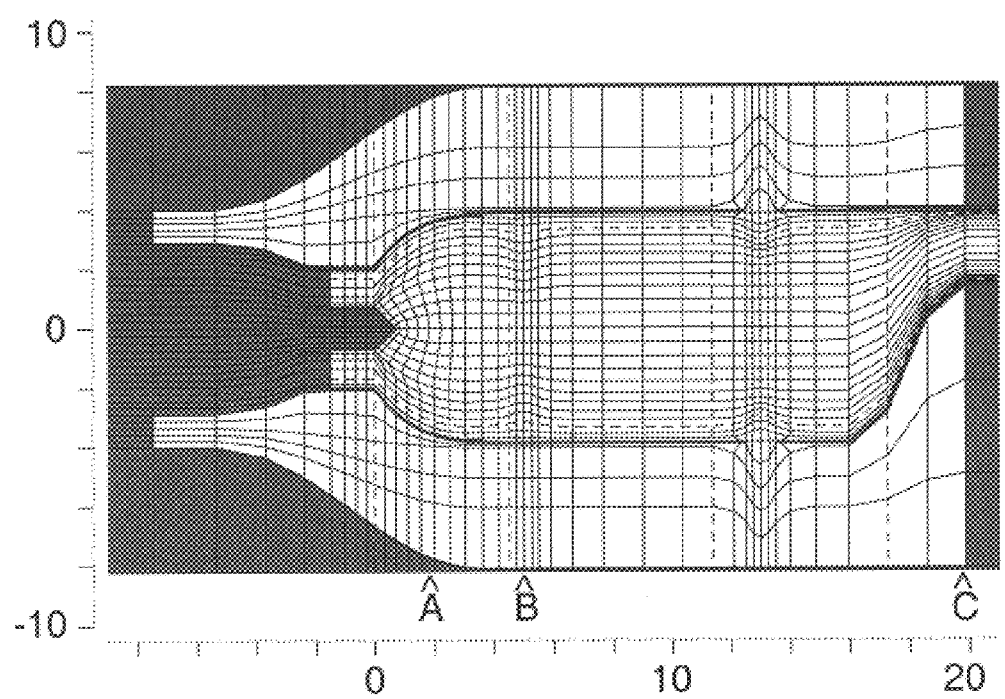
FIG. 7 shows a cross section of the standard heater of FIG. 6.

The subsequent FIG. 7 shows a cross section of the heater, modeled through a structured grid having:

19 layers of vertices in the radial direction (index I of FIG. 5A);

97 layers of vertices in the azimuthal direction (index J of FIG. 5A); and 43 layers of vertices in the axial direction (index K of FIG. 5A), for a total of 79249 vertices.

The high stratification in the azimuthal direction is necessary to assure the minimum level of geometrical modelization in the region of the shell of the combustion chamber corresponding to the lateral holes 18, 19. On the other hand, said stratification is redundant in other portions of the calculation domain. Furthermore, it causes a considerable thinning of the cells situated on the heater axis, which is typical of the structured grids, as already pointed out several times during the present description.

Thus, this grid suits very much to the application of the method according to the present invention. The successive FIG. 8 illustrates a table relative to the application of said method on the standard heater. The semistructuring was applied only in the azimuthal direction. The first three columns of the table in FIG. 8 represent the limits, for every direction, of the various sub-blocks (one for each line). For each direction, the absence of limits is indicated by two zeros. In these cases, it is to be understood that the extension of the sub-block in that direction coincides with that of the block of the whole grid, i.e. 1–97 for the direction j and 1–43 for the direction k. The fourth column indicates the number NJn of final vertices comprised in the azimuthal arc defined by the sub-block. Whenever a domain portion is comprised in more sub-blocks, it is semistructured according to the indications of the last listed sub-block.

As a mere example, the reduction factor FRID for the first sub-block corresponds to:

$$FRID=(NJp-1)/(NJn-1)=(97-1)/(13-1)=8.$$

Therefore, the first layer of cells of the semistructured grid has a number of real cells corresponding to one eighth of those of the structured grid.

FIG. 9 compares the cross sections, limited to a 90° sector, of the structured grids and of the semistructured grids in correspondence of the layers of axial vertices A, B and C indicated in the previous FIG. 7. As it can be seen, the sections of the semistructured grid show a variable thinning of the cells, particularly relevant on the grid axis.

Figure 10:
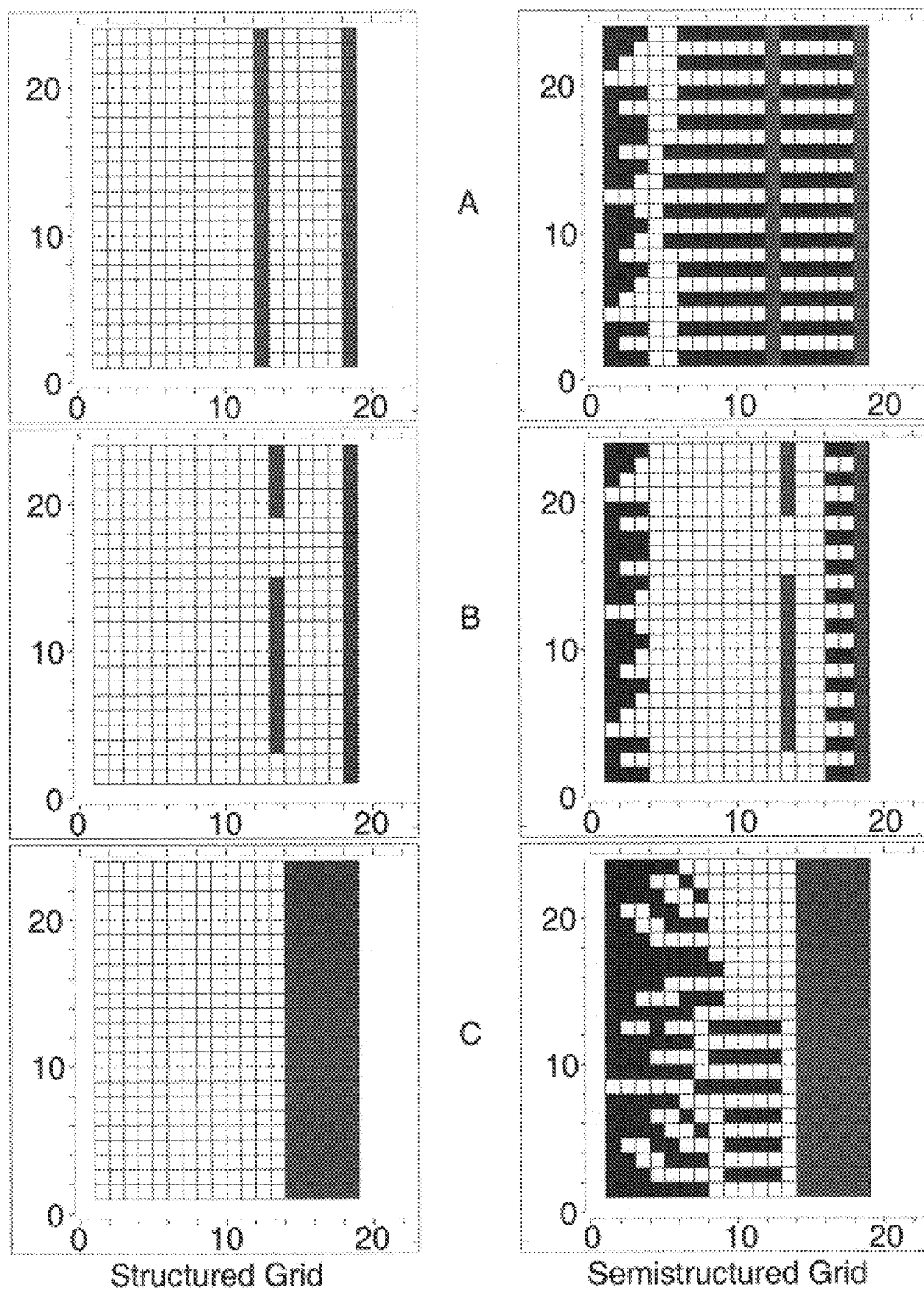
FIG. 10 shows a plurality of comparative schemes in the indicial space between representations of the standard heater through a semistructured grid and representations of the standard heater through a structured grid.

The variability of the thinning is more evident in the subsequent FIG. 10, which compares the indicial space of the three above mentioned cross sections and wherein the virtual cells of the sections relative to the semistructured grid are colored in black.

This semistructuring allowed an about 30% reduction (from 56640 to 39880) in the active real cells, and a reduction in the excessive and penalizing thickening toward the axis of the structured grid.

The semistructured version of the numerical solver TFD was applied to both the above described grids. In particular, the following examples were conducted:

example A: conducted using the semistructured grid, starting from initial rest conditions and protracted for 20000 calculation cycles;

example B1: like in the example A, but using the structured grid;

example B2: like in the example B1, but starting from initial conditions corresponding to those calculated at the end of the example A.

Figure 11:
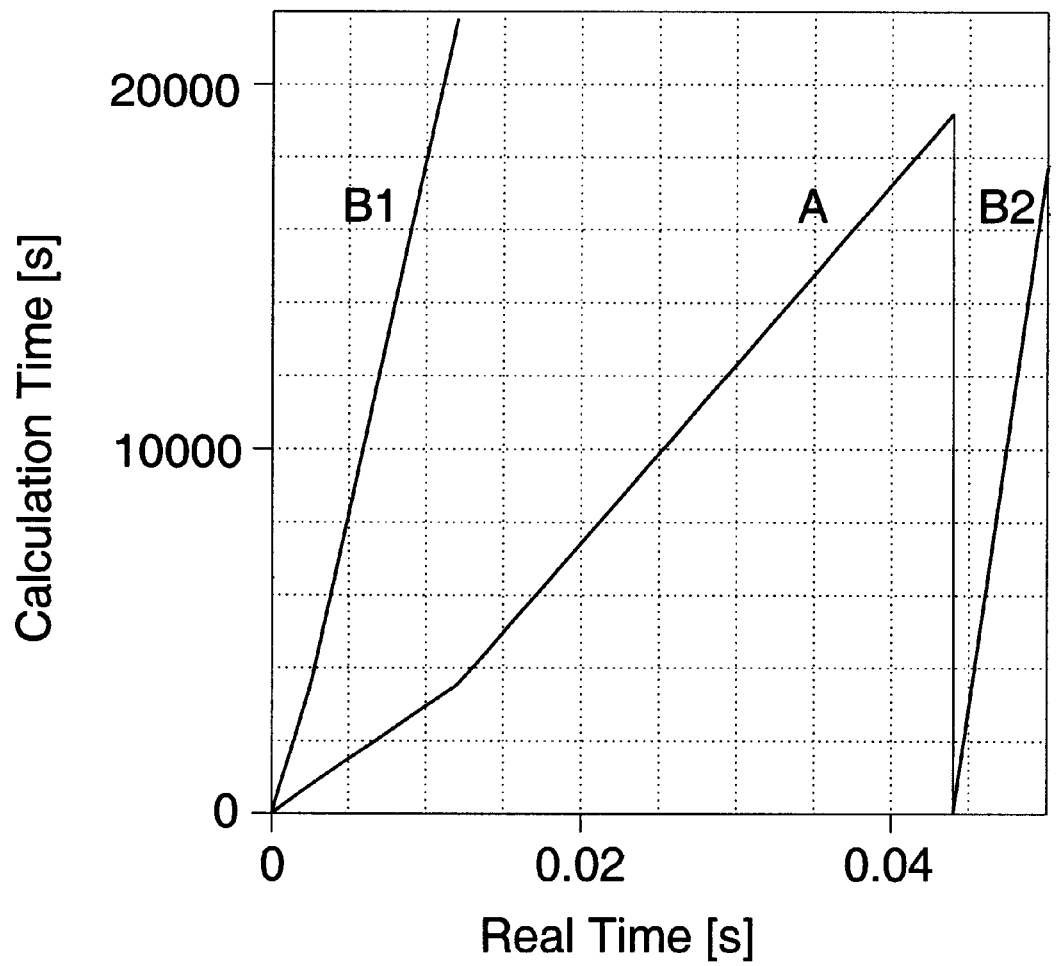
FIG. 11 shows a comparative time chart illustrating the advantages of the method consistent with the present invention.

The simulated real time and the calculation time used in the three examples are shown in the graph of FIG. 11 and summarized in the following table:

| Example | Type of grid | Initial cond. | Number of cycles | Real time | Calculat. time |
|---|---|---|---|---|---|
| A | semistruct. | rest | 20000 | 0.044 s | 19200 s |
| B1 | struct. | rest | 20000 | 0.012 s | 21800 s |
| B2 | struct. | ex. A | 20000 | 0.006 s | 17700 s |

From these data it is evident that to simulate a real transient of 0.04 s, necessary and sufficient in the examined standard heater to reach the steady-state working conditions starting from an initial condition of rest, 17000 s are needed with the semistructured grid and, extrapolating the data from the previous table, 107000 s with the structured one. Therefore, the use of the semistructured grid allowed in this case a reduction in calculation time of a factor higher than 6.

This reduction of the calculation time, besides the reduction of the number of the real cells, depended most of all on the elongation of the elementary integration time steps that involved a reduction in the global number of steps to be executed with a corresponding simulated real time. This increase of the integration time step is related to the increase in the minimum thickness of the cells that went from 0.069 mm for the structured grid to 0.28 mm for the semistructured one.

Figure 14:
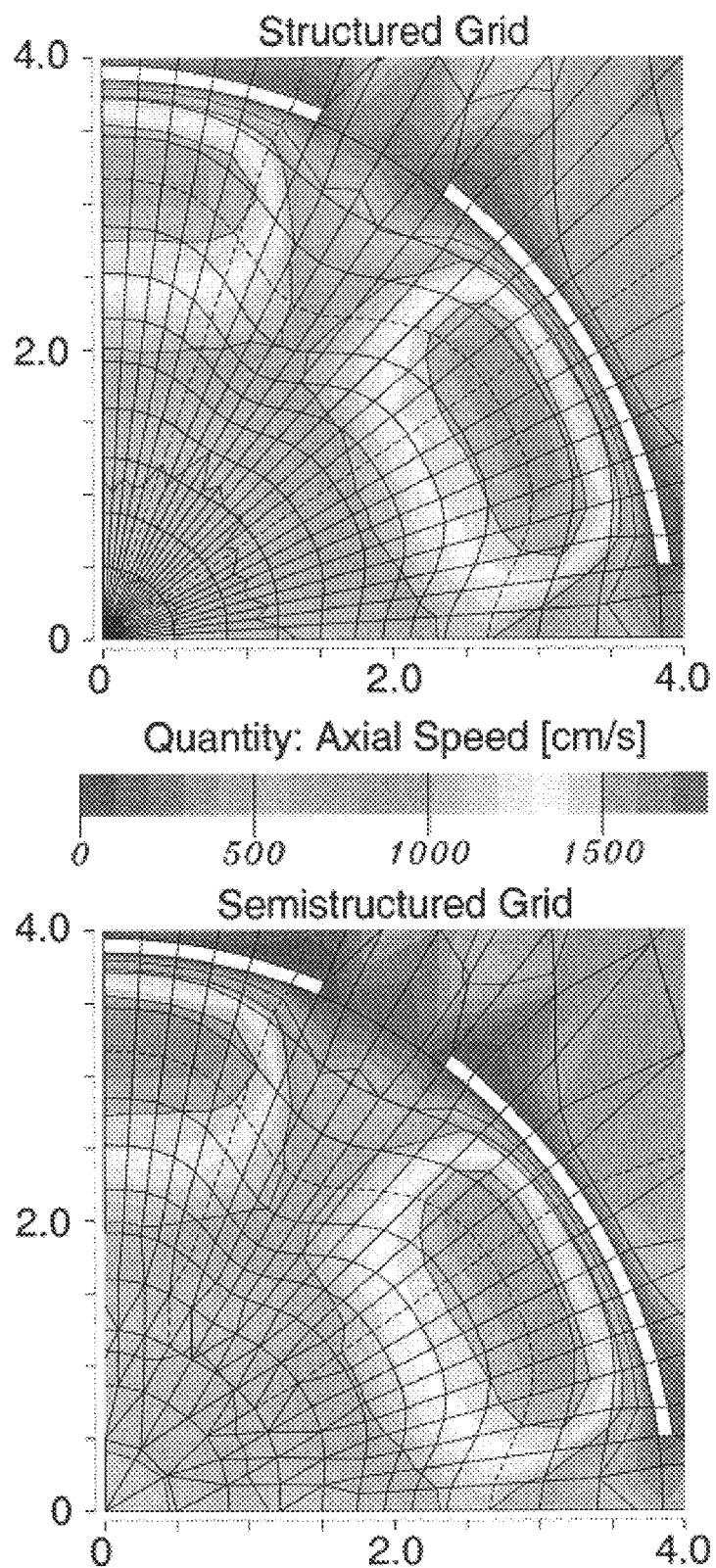
Figure 15:
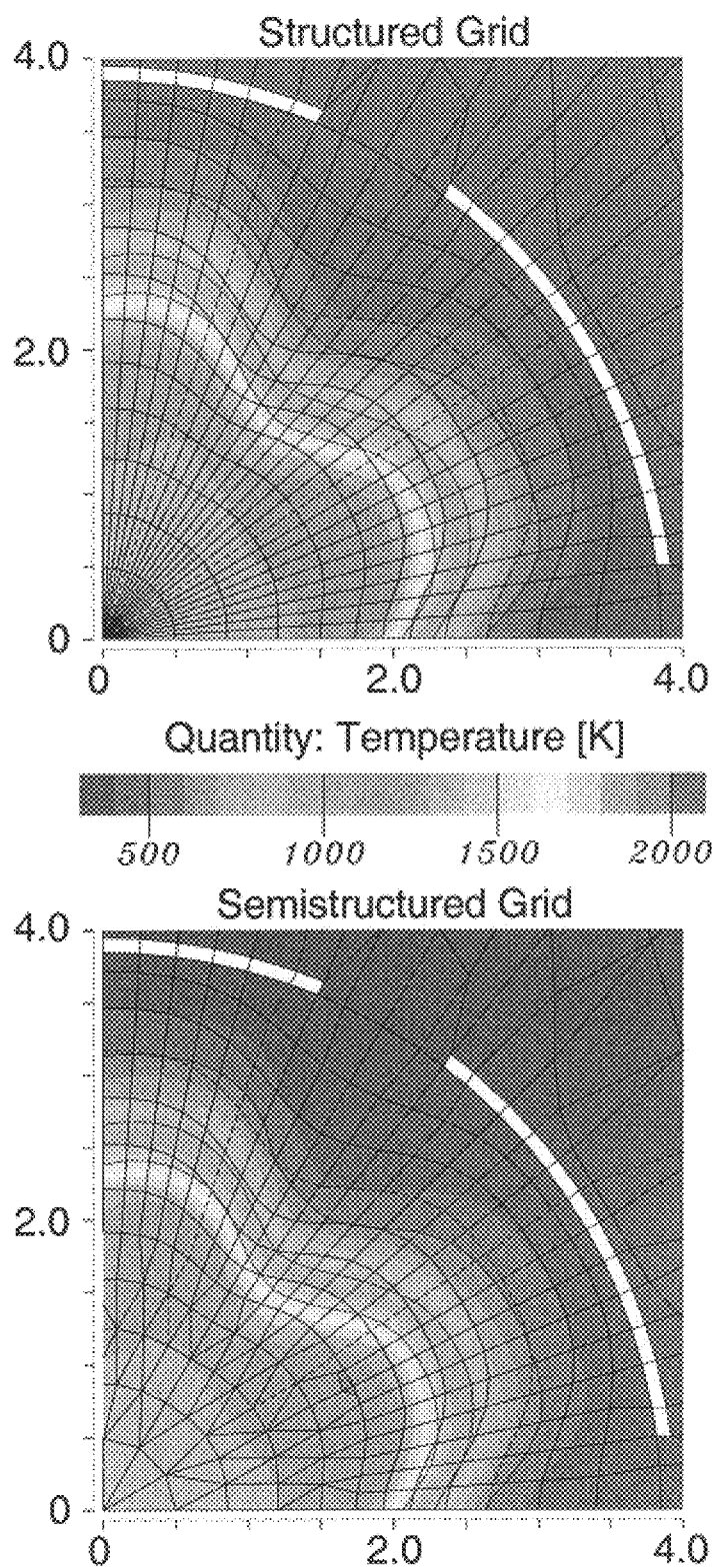

As to the spatial distribution of the TFD quantities calculated, the use of the two grids gave practical identical results, as it is shown in the maps from FIG. 12 to FIG. 15, comparing the results obtained at the end of the example A with those obtained at the end of the example B2. In particular, the FIGS. 12 and 13 compare the distribution of the speed module and temperature in the meridian vertical plane. On the other hand, the FIGS. 14 and 15 compare the distributions of the axial speed and of the temperature in the cross plane in correspondence of the first set of lateral holes.

Computer Architecture

Figure 16:
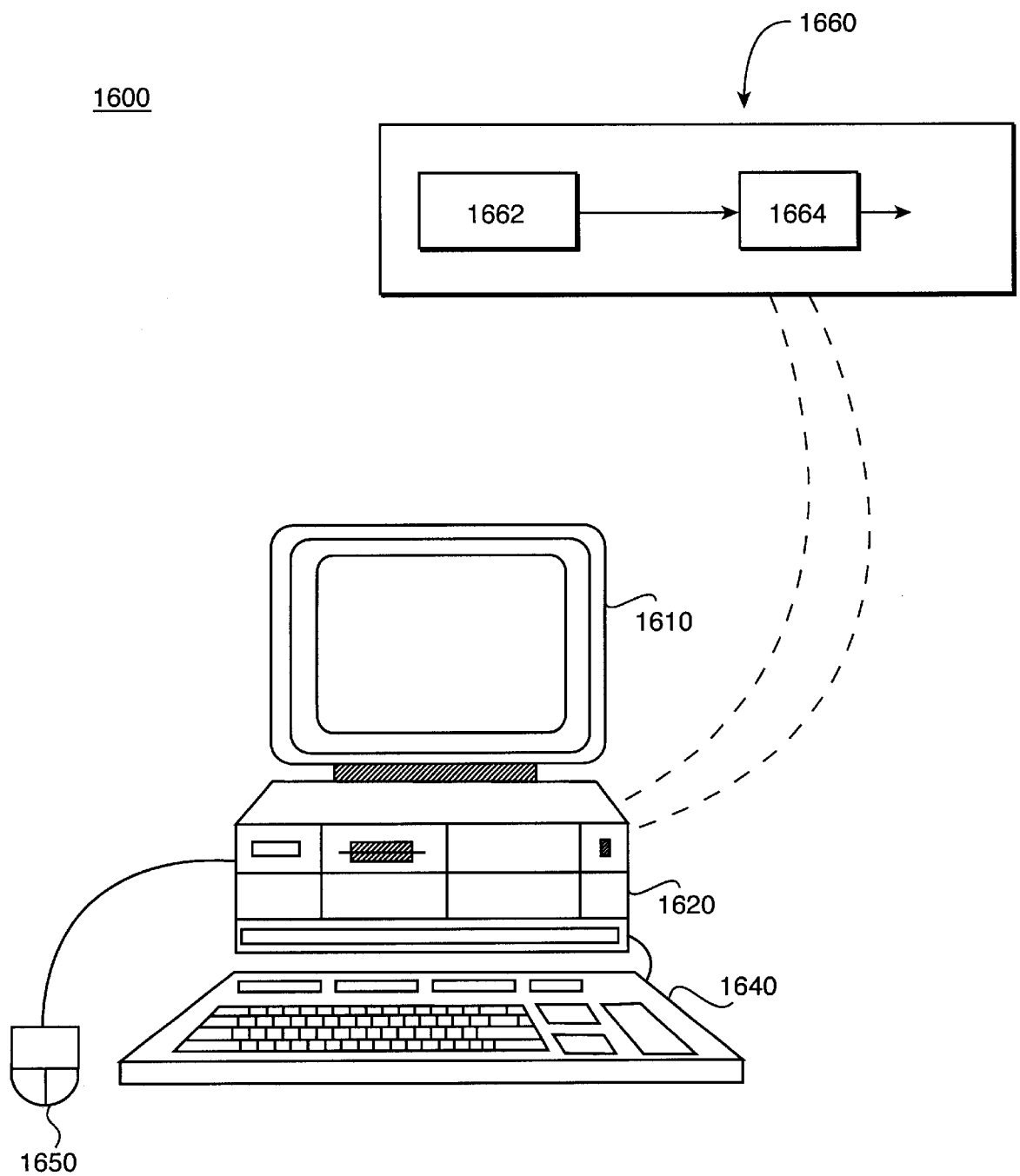
FIG. 16 shows a block diagram of an exemplary computer system consistent with the present invention.

FIG. 16 illustrates an architecture for a computer system 1600 with which methods and systems consistent with the present invention may be implemented. The exemplary computer system of FIG. 16 is for descriptive purposes only and is not intended to limit application of method and systems consistent with the present invention to use with a particular architecture. Although the description may refer to terms commonly used in describing particular computer systems, such as in IBM PS2 personal computer, the description and concepts equally apply to other computer systems such as network computers, workstations, and mainframe computers having architectures that may be different from the architecture shown in FIG. 16.

Computer system 1600 includes a video display 1610, such as a CRT or LCD screen, a personal computer 1620, a keyboard 1640, and an input device 1650. Computer system 1600 also includes a memory 1660, as part of personal computer 1620, for implementing the process for semistructuring D8 and the numerical solver process D10.

Memory 1660 includes a semistructuring procedure 1662 and a numerical solver procedure 1664. Semistructuring procedure 1662 generates a semistructured grid from a structured grid. After completing the semi structured grid, procedure 1662 then passes the semistructured grid to the numerical solver procedure 1664. The numerical solver procedure 1664 treats the semistructed grid above. In particular, the numerical solver procedure 1664 along with other data, determines the real elements for each direction and only performs calculations on the real elements.

Conclusion

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone.

I claim:

1. A method for representing, in the field of thermofluidodynamics, a physical phenomena extending in a bidimensional spatial domain using semistructured calculation grids obtained through a semistructuring process, wherein the bidimensional spatial domain begins from an initial discretisation of the spatial domain performed by a structured calculation grid, said grid dividing the spatial domain into cells, each cell delimited by sides, each side obtained by joining a set of vertices, said vertices placed on two ordered sheaves of layers of vertices, said layers evolving in two indicial directions so that each of said vertices is detected by a pair of indices representing the two layers to which it belongs, said method comprising the steps, performed by a processor, of:

detecting one or more sub-blocks, each sub-block formed by the set of the vertices of the grid comprised, for each one of the two indicial directions, between a pair of layers of vertices evolving in said indicial direction;

fixing for each sub-block an indicial direction for grouping the vertices, called a semistructuring direction;

detecting a sheaf of sub-meshes in said sub-block in said semistructuring direction, each sub-mesh of said sheaf consisting of a number of vertices lined along the semistructuring direction in a same number of distinct initial positions forming distinct vertices;

determining for each sub-block a number of distinct final positions lower than the number of distinct initial positions, in which the vertices for each sub-mesh are grouped; and grouping, for each sub-block, the vertices of each sub-mesh in said number of different final positions, as to obtain a same number of different vertices for each sub-mesh of the sub-block, detecting at the same time, for each sub-block, a set of virtual vertices corresponding to a difference between an initial and a final number of vertices of that sub-block.

2. The method of claim 1, wherein said semistructured calculation grids are represented through the indication of the position of both the distinct vertices and the set of virtual vertices, the position of each one of said virtual vertices being coincident with one of the positions of the distinct vertices.

3. The method of claim 1, wherein said semistructured calculation grids are represented only through the listing of the distinct vertices as well as an indication of their position.

4. The method of claim 1, 2 or 3, wherein said physical phenomena represented extends in a cylindrical bidimensional spatial domain determined by a radial indicial direction, an azimuthal indicial direction and an axial indicial direction, wherein the semistructuring direction is the azimuthal indicial direction.

5. A method for representing, in the field of thermofluidodynamics, a physical phenomena extending in a tridimensional spatial domain using semistructured calculation grids obtained through a semistructuring process, wherein the tridimensional spatial domain begins from an initial discretisation of the spatial domain performed by a structured calculation grid, said grid dividing the spatial domain into cells, each cell delimited by polygonal faces, each face obtained by joining a set of vertices, said vertices placed on three ordered sheaves of layers of vertices, said layers evolving in three indicial directions so that each of said vertices is detected by a triad of indices representing the three layers to which it belongs, said method comprising the steps, performed by a processor, of:

detecting one or more sub-blocks, each sub-block formed by the set of the vertices of the grid comprised, for each one of the three indicial directions, between a pair of layers of vertices evolving in said indicial direction;

fixing for each sub-block an indicial direction for grouping the vertices, called a semistructuring direction;

detecting a sheaf of sub-meshes in said sub-block in said semistructuring direction, each sub-mesh of said sheaf consisting of a number of vertices lined along the semistructuring direction in a same number of distinct initial positions forming distinct vertices;

determining for each sub-block a number of distinct final positions lower than a number of distinct initial positions, in which the vertices for each sub-mesh are grouped; and grouping, for each sub-block, the vertices of each sub-mesh in said number of different final positions, as to obtain a same number of different vertices for each sub-mesh of the sub-block, detecting at the same time, for each sub-block, a set of virtual vertices corresponding to a difference between an initial and a final number of vertices of that sub-block.

6. The method of claim 5, wherein said semistructured calculation grids are represented through the indication of the position of both the distinct vertices and the set of virtual vertices, the position of each one of said virtual vertices being coincident with one of the positions of the distinct vertices.

7. The method of claim 5, wherein said semistructured calculation grids are represented only through the listing of the distinct vertices as well as an indication of their position.

8. The method of claims 5, 6 or 7, wherein said physical phenomena represented extends in a cylindrical tridimensional spatial domain determined by a radial indicial direction, an azimuthal indicial direction and an axial indicial direction, wherein the semistructuring direction is the azimuthal indicial direction.

9. A computer-readable medium containing instructions, for controlling a data processing system to perform a method, the data processing system representing, in the field of thermofluidodynamics, a physical phenomena extending in a tridimensional spatial domain using semistructured calculation grids obtained through a semistructuring process, wherein the tridimensional spatial domain begins from an initial discretisation of the spatial domain performed by a structured calculation grid, said grid dividing the spatial domain into cells, each cell delimited by polygonal faces, each face obtained by joining a set of vertices, said vertices placed on three ordered sheaves of layers of vertices, said layers evolving in three indicial directions so that each of said vertices is detected by a triad of indices representing the three layers to which it belongs, said method comprising the steps of:

detecting one or more sub-blocks, each sub-block formed by the set of the vertices of the grid comprised, for each one of the three indicial directions, between a pair of layers of vertices evolving in said indicial direction;

fixing for each sub-block an indicial direction for grouping the vertices, called a semistructuring direction;

detecting a sheaf of sub-meshes in said sub-block in said semistructuring direction, each sub-mesh of said sheaf consisting of a number of vertices lined along the semistructuring direction in a same number of distinct initial positions forming distinct vertices;

determining for each sub-block a number of distinct final positions lower than a number of distinct initial positions, in which the vertices for each sub-mesh are grouped; and grouping, for each sub-block, the vertices of each sub-mesh in said number of different final positions, as to obtain a same number of different vertices for each sub-mesh of the sub-block, detecting at the same time, for each sub-block, a set of virtual vertices corresponding to a difference between an initial and a final number of vertices of that sub-block.

10. A system for representing, in the field of thermofluidodynamics, a physical phenomena extending in a tridimensional spatial domain using semistructured calculation grids obtained through a semistructuring process, comprising:

a memory having program instructions and a data structure representing the tridimensional spatial domain beginning from an initial discretisation of the spatial domain performed by a structured calculation grid, said grid dividing the spatial domain into cells, each cell delimited by polygonal faces, each face obtained by joining a set of vertices, said vertices placed on three ordered sheaves of layers of vertices, said layers evolving in three indicial directions so that each of said vertices is detected by a triad of indices representing the three layers to which it belongs; and a processor responsive to the program instructions and configured to:

detect one or more sub-blocks, each sub-block formed by the set of the vertices of the grid comprised, for each one of the three indicial directions, between a pair of layers of vertices evolving in said indicial direction;

fix for each sub-block an indicial direction for grouping the vertices, called a semistructuring direction;

detect a sheaf of sub-meshes in said sub-block in said semistructuring direction, each sub-mesh of said sheaf consisting of a number of vertices lined along the semistructuring direction in a same number of distinct initial positions forming distinct vertices;

determine for each sub-block a number of distinct final positions lower than a number of distinct initial positions, in which the vertices for each sub-mesh are grouped; and group, for each sub-block, the vertices of each sub-mesh in said number of different final positions, as to obtain a same number of different vertices for each sub-mesh of the sub-block, detecting at the same time, for each sub-block, a set of virtual vertices corresponding to a difference between an initial and a final number of vertices of that sub-block.

11. The system of claim 10, wherein said program is further configured to represent the semistructured calculation grids through the indication of the position of both the distinct vertices and the set of virtual vertices, the position of each one of said virtual vertices being coincident with one of the positions of the distinct vertices.

12. The system of claim 10, wherein said program is further configured to represent the semistructured calculation grids only through a listing of the distinct vertices as well as an indication of their position.

13. The system of claims 10, 11 or 12, wherein the physical phenomena represented extends in a cylindrical tridimensional spatial domain determined by a radial indicial direction, an azimuthal indicial direction and an axial indicial direction of the represented physical phenomena; and the semistructuring direction is the azimuthal indicial direction.

* * * * *